United States Patent
Kujawski

(10) Patent No.: US 10,432,351 B2
(45) Date of Patent: Oct. 1, 2019

(54) COMPUTER NETWORK SYSTEM AND METHOD TO REDUCE NETWORK LATENCY WITH A POOL OF READY CONNECTIONS

(71) Applicant: Aagey Holding, LLC, Atlanta, GA (US)

(72) Inventor: Edward T. Kujawski, Alpharetta, GA (US)

(73) Assignee: Aagey Holding, LLC, Atlanta, GA (US)

( * ) Notice: Subject to any disclaimer, the term of this patent is extended or adjusted under 35 U.S.C. 154(b) by 70 days.

(21) Appl. No.: 15/786,546

(22) Filed: Oct. 17, 2017

(65) Prior Publication Data

US 2019/0115998 A1    Apr. 18, 2019

(51) Int. Cl.
| | | |
|---|---|---|
| H04L 1/00 | (2006.01) | |
| H04L 29/08 | (2006.01) | |
| H04W 72/10 | (2009.01) | |
| H04W 72/04 | (2009.01) | |
| H04L 29/06 | (2006.01) | |

(52) U.S. Cl.
CPC .......... *H04L 1/0018* (2013.01); *H04L 63/166* (2013.01); *H04L 67/1014* (2013.01); *H04L 67/141* (2013.01); *H04L 67/143* (2013.01); *H04L 67/145* (2013.01); *H04L 69/14* (2013.01); *H04W 72/0486* (2013.01); *H04W 72/10* (2013.01)

(58) Field of Classification Search
CPC ............. H04L 67/1014; H04L 67/1004; H04L 1/0018; H04L 63/166; H04L 69/14; H04L 67/145; H04L 67/141; H04L 67/143; H04W 72/0486; H04W 72/10

See application file for complete search history.

(56) References Cited

U.S. PATENT DOCUMENTS

| | | | |
|---|---|---|---|
| 6,526,501 B2 | 2/2003 | Edwards et al. | |
| 6,665,737 B2 | 12/2003 | Edwards | |
| 6,763,384 B1 | 7/2004 | Gupta et al. | |
| 7,526,557 B2 | 4/2009 | Bowler | |
| 7,623,546 B1 | 11/2009 | Bashyam et al. | |
| 7,653,730 B1 | 1/2010 | Hoffman et al. | |
| 7,716,312 B2 | 5/2010 | Gamble | |
| 7,908,339 B2 | 3/2011 | Keith, Jr. | |
| 8,244,865 B2 * | 8/2012 | Burke | H04L 67/14 709/201 |

(Continued)

FOREIGN PATENT DOCUMENTS

| | | |
|---|---|---|
| JP | 2009100118 | 5/2009 |
| WO | 2012149078 | 11/2012 |

OTHER PUBLICATIONS

International Search Report dated Jan. 4, 2019 for corresponding PCT/US2018/056388.

*Primary Examiner* — Ivan O Latorre
(74) *Attorney, Agent, or Firm* — Jeffrey C. Watson; Mathew L. Grell; Grell & Watson Patent Attorneys LLC

(57) ABSTRACT

A computer network system to reduce network latency, and method thereof, includes a client system, and a server system. The client system is configured to establish a pool of ready connections comprising multiple requests with the server system. Whereby the server system is configured to hold the pool of ready connections open for future information to the client system.

17 Claims, 2 Drawing Sheets

(56) References Cited

U.S. PATENT DOCUMENTS

| | | | |
|---|---|---|---|
| 8,667,145 B2 | 3/2014 | Bowler | |
| 8,868,638 B2 | 10/2014 | Scoda | |
| 8,984,164 B2 | 3/2015 | Scoda | |
| 9,930,122 B1* | 3/2018 | Kilday | H04L 67/141 |
| 2003/0208505 A1* | 11/2003 | Mullins | G06F 16/289 |
| 2004/0088413 A1* | 5/2004 | Bhogi | G06F 9/5061 |
| | | | 709/226 |
| 2004/0221031 A1* | 11/2004 | Desai | H04L 67/42 |
| | | | 709/224 |
| 2006/0173866 A1* | 8/2006 | Newport | H04L 67/42 |
| 2008/0228864 A1* | 9/2008 | Plamondon | G06F 16/9574 |
| | | | 709/203 |
| 2008/0228923 A1* | 9/2008 | Chidambaran | H04L 67/14 |
| | | | 709/227 |
| 2011/0153581 A1* | 6/2011 | Kass | G06F 16/256 |
| | | | 707/705 |
| 2011/0280247 A1 | 11/2011 | Roskind | |
| 2012/0278475 A1* | 11/2012 | Papakipos | G06Q 10/10 |
| | | | 709/224 |
| 2013/0212227 A1* | 8/2013 | Thomas | H04L 67/02 |
| | | | 709/219 |
| 2014/0019628 A1* | 1/2014 | Shankar | G06F 9/541 |
| | | | 709/228 |
| 2015/0078376 A1 | 3/2015 | Wisehart | |
| 2017/0244637 A1* | 8/2017 | Singhal | H04L 45/7453 |
| 2017/0324628 A1* | 11/2017 | Dhanabalan | H04L 47/24 |
| 2017/0331674 A1* | 11/2017 | Wang | H04L 67/1002 |
| 2018/0034848 A1* | 2/2018 | Jalan | H04L 63/1458 |

* cited by examiner

COMPUTER NETWORK SYSTEM AND METHOD TO REDUCE NETWORK LATENCY WITH A POOL OF READY CONNECTIONS

FIELD OF THE DISCLOSURE

The present disclosure generally relates to computer network communications between computers, and more particularly to a computer network system and method for reducing network latency in delivering data between computers with a pool of ready connections.

BACKGROUND

Network latency is the amount of time a message takes to traverse a network system. In a computer network, it is an expression of how much time it takes for a packet of data to get from one designated point to another. It is sometimes measured as the time required for a packet to be returned to its sender. Latency can depend on the speed of the transmission medium (e.g., copper wire, optical fiber or radio waves) and the delays in the transmission by devices along the way (e.g., routers and modems). A low latency indicates a high network efficiency. Latency and throughput are the two most fundamental measures of network performance. They are closely related, but whereas latency measures the amount of time between the start of an action and its completion, throughput is the total number of such actions that occur in a given amount of time.

Sending data in large packets has a higher throughput than sending the same data in small packets both because of the smaller number of packet headers and because of reduced startup and queuing latency. If the data is streamed (i.e., sent in a continuous flow), propagation latency has little effect on throughput, but if the system waits for an acknowledgment after each packet before sending the next, the resulting high propagation latency will greatly reduce throughput.

Latency is an important consideration with regards to other aspects of computers, particularly where real time (i.e., nearly instantaneous) response is required. For example, in some internet games, a high latency (also called lag) can add to the difficulty of determining which player performed an action first (such as shooting an opponent or answering a question). In playing computer-based musical instruments, latencies greater than 100 milliseconds make it difficult for players to get the nearly instantaneous feedback that they require.

Network latency in a packet-switched network is measured either one-way (the time from the source sending a packet to the destination receiving it), or round-trip delay time (the one-way latency from source to destination plus the one-way latency from the destination back to the source). Round-trip latency is more often quoted, because it can be measured from a single point. Latency limits total throughput in reliable two-way communication systems as described by the bandwidth-delay product. The processing latency that may be reduced by the instant disclosure may be the connection latency.

When computers are communicating over a network, several actions for connectivity are performed for every network connection before the transmission of data. For example, tcp sync packet, tcp ack packet, and a TLS handshake with and without a session cache, may be performed to establish network connections for computer communication. As faster speed is almost always a desire in computer networking, like in communication systems for health care and other industries, there is clearly a desire to speed up and/or eliminate some of these actions performed for connectivity in network connection.

The instant disclosure of a system and method to reduce network latency with a pool of ready connections may be designed to solve at least some of the problems disclosed above.

SUMMARY

Briefly described, in a possibly preferred embodiment, the present disclosure overcomes the above-mentioned disadvantages and meets the recognized need for such an apparatus or method by providing of a computer network system to reduce network latency with a pool of ready connections, and method thereof. The computer network system may include a client system, and a server system. The client system may be configured to establish a pool of ready connections comprising multiple requests with the server system. Whereby, the server system may be configured to hold the pool of ready connections open for future information to the client system.

One feature of the instant computer network system may be that the pool of ready connections may be established by the client system only for waiting for data to become available from the server system, whereby once data from the server system becomes available, the data is sent to the already connected client system for delivery.

Another feature of the instant computer network system may be that the latency of the computer network system may not include connection handshakes contributing to the timing of transmitting data. These connection handshakes not included in the instant connections, may not include, but are not limited to not include, a TCP connection, an https certificate, a key negotiation, a database access for authentication and authorization, the like, and/or combinations thereof.

Another feature of the instant computer network system may be that the client system may make multiple requests for the pool of ready connections, where each request may have an expiration time with the server system. If no message is available from the server system, the server system may be configured to time out the request based on the expiration time of the request, and the server system may return a result and close the connection. And, if a new message is available, the server system may be configured to choose one of the pool of ready connections to return the new message to the client system. Wherein, when the client system establishes the pool of ready connections to the server system, as each connection hits their expiration time, the connection may be closed and re-connected with a reconnection delay. Whereby there may always be fresh connections to the server system with the client system. In select embodiments, at the time that the new message is available to the client system, the server system may be configured to select from the pool of ready connections, and send the message response to the client system without the need to establish a connection.

Another feature of the instant computer network system may be that the server system may not wait for a connection to be established to send the new message, wherein the computer network system may have a connection security that has already been established. In select embodiments, the connection security of the computer network system may be https. In select embodiments, a setup time for a TCP connection and a key negotiation may be included in each of the multiple requests for the pool of ready connections.

Whereby, the setup time for the TCP connection and the key negotiation may not be included in a timing for the message transmission latency.

In select embodiments, the instant computer network system may use existing API and protocols. Whereby, an existing client system may be configured for the pool of ready connections, or updated to support the pool of ready connections to the server system.

In select embodiments, the instant computer network system may be configured to transmit information between the client system and the server system at a 0.10 ms delay or less between a first client sending information and a second client receiving the information. In select possibly preferred embodiments, the computer network system may be configured to transmit information between the client system and the server system at approximately a 0.02 ms delay between the first client sending information and the second client receiving the information.

Another feature of the instant computer network system may be that it can be configured to reduce network traffic by having the server system hold the pool of ready connections open in anticipation of new information. Therefore, the instant computer network system may not have a client constantly polling the server for new information when no information is available. Whereby, during the time of no additional information, the network traffic may be reduced.

Another feature of the instant computer network system may be that it can be configured to permit a smaller sever footprint to support the same number of clients. The clients may ask for information from the server fewer times, whereby an amount of computer resources needed to service the requests of the clients may be reduced. In select embodiments, the computer network system may be configured to connect at least 500 clients simultaneously. In select possibly preferred embodiments, the computer network system may be configured to connect at least 5,000 clients simultaneously. In select possibly most preferred embodiments, the computer network system may be configured to connect at least 10,000 clients simultaneously.

In another aspect, the instant disclosure may embrace a method to reduce latency in a computer network system via a pool of ready connections. The method may include the computer network system with the pool of ready connections in any of the embodiments shown and/or described herein. As such, the method may generally include the step of providing the computer network system in any of the embodiments as shown and/or described herein, including the client system and the server system.

The method to reduce latency in a computer network system may then include the steps of: the client system establishing a pool of ready connections on a server system with multiple requests for information; the step of setting an expiration time for each ready connection, wherein, if no message is available from the server system, the server system is configured to time out the request based on the expiration time of the request, and the server system returns a result and closes the connection, and if a new message is available, the server system is configured to choose one of the pool of ready connections to return the new message to the client system; the step of the server system holding the pool of ready connections open for future information when not having any information for the client system, whereby the server system does not respond immediately; the step of the server system selecting one of the pool of ready connections and responding with information once information for the client system becomes available to the server system; and the step of, if no information for the client system becomes available within a timeout period, the server system then responding to the client system without any information.

One feature of the instant method may be that the pool of ready connections may be established by the client system only for waiting for data to become available from the server system, whereby once data from the server system becomes available, the data may be sent to the already connected client system for delivery.

In select embodiments of the instant method to reduce computer network latency, a latency of the computer network system may not include connection handshakes contributing to the timing of transmitting data. These connection handshakes not included in the instant method, may not include, but are not limited to not include, a TCP connection, an https certificate, a key negotiation, a database access for authentication and authorization, the like, and/or combinations thereof.

Another feature of the instant method may be that the server system does not wait for a connection to be established to send the new message, wherein the computer network system has a connection security that has already been established. In select embodiments, the connection security of the computer network system used in the instant method may be https. Wherein a setup time for a TCP connection and a key negotiation may be included in each of the multiple requests for the pool of ready connections. Whereby the setup time for the TCP connection and the key negotiation are not included in a timing for the message transmission latency.

Another feature of the instant method may be that when the client system establishes the pool of ready connections to the server system, as each connection hits their expiration time, the connection may be closed and re-connected with a reconnection delay, whereby there are always fresh connections to the server system with the client system.

Another feature of the instant method may be that at the time that the new message is available to the client system, the server system may be configured to select from the pool of ready connections, and send the message response to the client system.

The foregoing illustrative summary, as well as other exemplary objectives and/or advantages of the disclosure, and the manner in which the same are accomplished, may become more apparent to one skilled in the art from the prior Summary, and the following Brief Description of the Drawings, Detailed Description, and Claims when read in light of the accompanying Detailed Drawings.

BRIEF DESCRIPTION OF THE DRAWINGS

The present apparatuses, systems and methods will be better understood by reading the Detailed Description with reference to the accompanying drawings, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Figure 1:
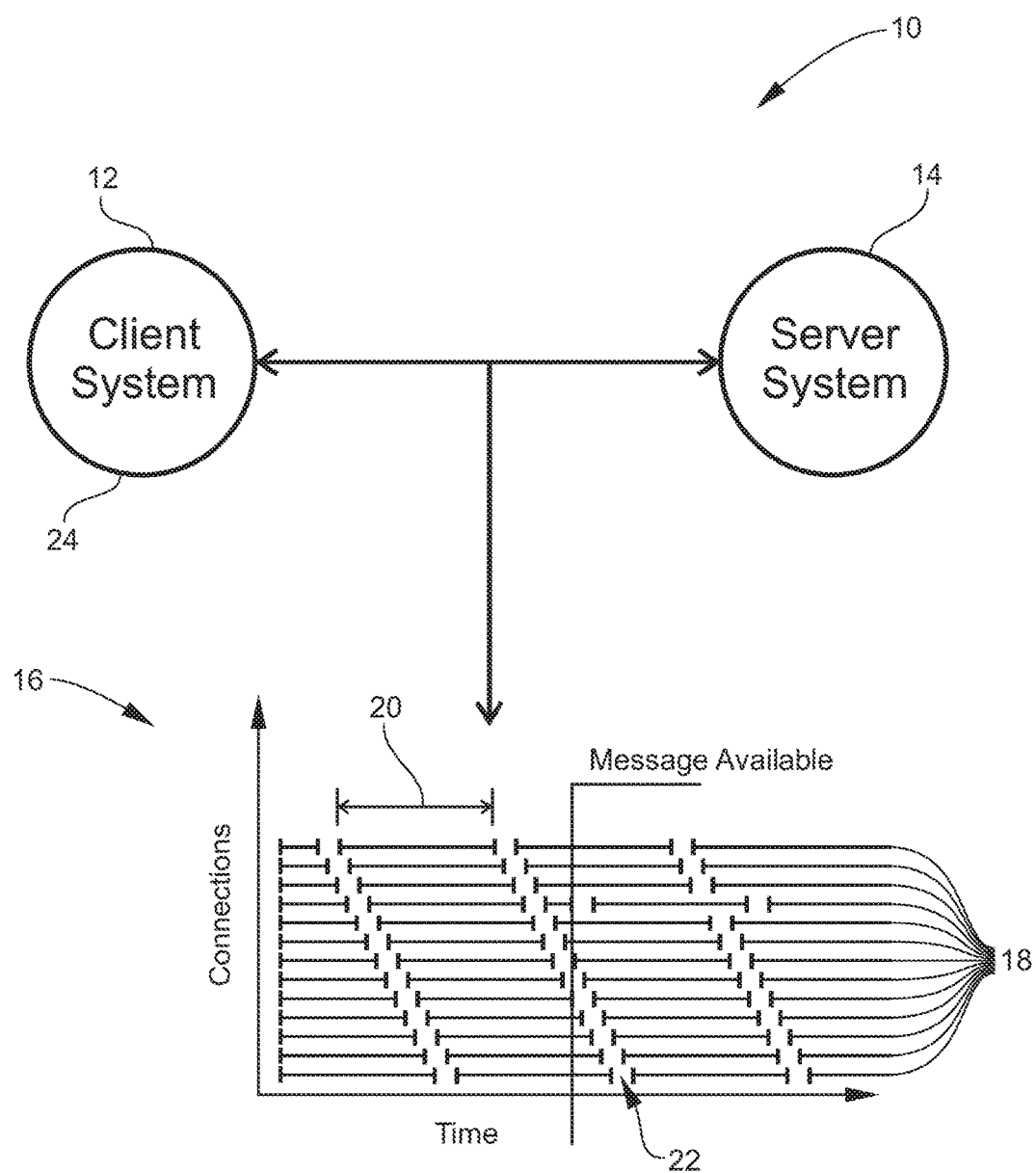
FIG. 1 shows a diagram of select embodiments of the network computer system according to the instant disclosure with a series of connections from the client to the server according to select embodiments of the instant disclosure, where time is graphed on the X-axis, and connections along the Y-axis.
Figure 2:
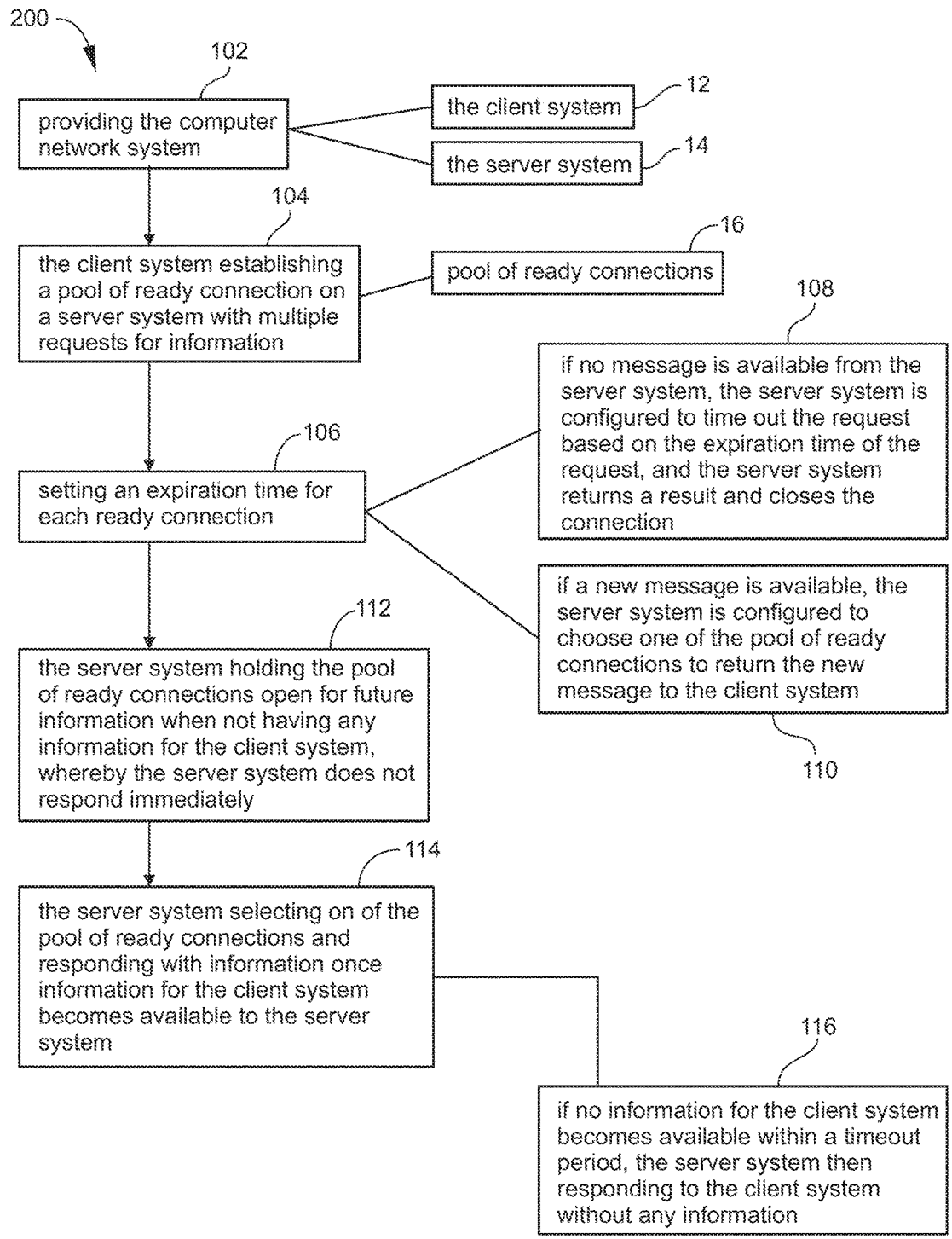
FIG. 2 shows a flow chart of the instant method for reducing network latency with a pool of ready connections according to select embodiments of the instant disclosure.

Referring now to FIGS. 1-2, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Referring now to FIG. 1, in a possibly preferred embodiment, the present disclosure overcomes the above-mentioned disadvantages and meets the recognized need for such an apparatus or method by providing of computer network system 10 to reduce network latency with pool of ready connections 16. Computer network system 10 may generally include client system 12, and server system 14. The components of computer network system 10, like the client system 12 and the server system 14, may be any computers, hardware, tangible medium, processors, drives, software, devices, the like, etc. configured for establishing pool of ready connections 16 in computer network system 10, as shown and/or described herein. The client system 12 may be configured to establish pool of ready connections 16 comprising multiple requests 18 with the server system 14. Whereby, the server system 14 may be configured to hold the pool of ready connections 16 open for future information to the client system 12. The pool of ready connections 16 may be established by the client system 12 only for waiting for data to become available from the server system 14. Whereby, once data from the server system 14 becomes available, the data is sent to the already connected client system 12 for delivery.

The latency of the computer network system 10 may be one feature or benefit of utilizing pool of ready connections 16 with computer network system 10. Utilizing pool of ready connections 16, the latency of computer network 10 may not include connection handshakes contributing to the timing of transmitting data. These connection handshakes not included in the instant connections, may not include, but are not limited to not include, a TCP connection, an https certificate, a key negotiation, a database access for authentication and authorization, the like, and/or combinations thereof. As shown in FIG. 1, the client system 12 may make multiple requests 18 for the pool of ready connections 16, where each request 18 may have expiration time 20 with the server system 14. If no message is available from the server system 14, the server system 14 may be configured to time out the request 18 based on the expiration time 20 of the request, and the server system 14 may return a result and close the connection. And, if a new message is available, the server system 14 may be configured to choose one of the pool of ready connections 16 to return the new message to the client system 12. Wherein, when the client system 12 establishes the pool of ready connections 16 with the server system 14, as each connection hits their expiration time 20, the connection may be closed and re-connected with reconnection delay 22. Whereby, there may always be fresh or open connections to the server system 14 with the client system 12. In select embodiments, at the time that the new message is available to the client system 12, the server system 14 may be configured to select from the pool of ready connections 16, and send the message response to the client system 12 without the need to establish a connection.

Utilizing pool of ready connections 16, the server system 14 may not wait for a connection to be established to send the new message. As a result, the computer network system 10 may have a connection security that has already been established. In select embodiments, the connection security of the computer network system 10 may be https. In select embodiments, a setup time for a TCP connection and a key negotiation may be included in each of the multiple requests 18 for the pool of ready connections 16. Whereby, the setup time for the TCP connection and the key negotiation may not be included in a timing for the message transmission latency.

The instant computer network system 10 may use existing API and protocols. Whereby, existing client system 24 may be configured for the pool of ready connections 16, or updated to support the pool of ready connections 16 to the server system.

The instant computer network system 10 may be configured to transmit information between the client system 12 and the server system 14 at a 0.10 ms delay or less between a first client sending information and a second client receiving the information. In select possibly preferred embodiments, the computer network system 10 may be configured to transmit information between the client system 12 and the server system 14 at approximately a 0.02 ms delay between the first client sending information and the second client receiving the information.

The instant computer network system 10 may be configured to reduce network traffic by having the server system 14 hold the pool of ready connections 16 open in anticipation of new information. Therefore, the instant computer network system 10 may not have a client constantly polling the server for new information when no information is available. Whereby, during the time of no additional information, the network traffic may be reduced.

The instant computer network system may also be configured to permit a smaller sever footprint to support the same number of clients. The clients may ask for information from the server fewer times, whereby an amount of computer resources needed to service the requests of the clients may be reduced. In select embodiments, the computer network system 10 may be configured to connect at least 500 clients simultaneously. In select possibly preferred embodiments, the computer network system may be configured to connect at least 5,000 clients simultaneously. In select possibly most preferred embodiments, the computer network system may be configured to connect at least 10,000 clients simultaneously. Previous implementations may only have 100-300 simultaneously connected clients.

Referring now to FIG. 2, method 100 to reduce latency in computer network system 10 via pool of ready connections 16 is shown. Method 100 may include computer network system 10 with pool of ready connections 16 in any of the embodiments shown and/or described herein. As such, method 100 may generally include step 102 of providing computer network system 10 in any of the embodiments as shown and/or described herein, including the client system 12 and the server system 14.

Method 100 to reduce latency in computer network system 10 may then include the steps of: step 104 of the client system establishing pool of ready connections 16 on server system 14 with multiple requests 18 for information; step 106 of setting expiration time 20 for each ready connection, wherein, in step 108 if no message is available from the server system 14, the server system 14 is configured to time out the request based on the expiration time 20 of the request, and the server system 14 returns a result and closes the connection, and in step 110 if a new message is available, the server system 14 is configured to choose one of the pool of ready connections 16 to return the new message to the client system 12; the step 112 of the server system holding the pool of ready connections 16 open for future information when not having any information for the client system 12, whereby the server system 14 does not respond immediately; the step 114 of the server system 14 selecting one of the pool of ready connections 16 and responding with information once information for the client system 12 becomes available to the server system 14; and the step 116 of, if no information for the client system 12 becomes available within a timeout period, the server system 14 then responding to the client system 12 without any information.

One feature of the method 100 may be that the pool of ready connections 16 may be established by the client system 12 only for waiting for data to become available from the server system 14, whereby once data from the server system 14 becomes available, the data may be sent to the already connected client system 12 for delivery.

In select embodiments of the method 100 to reduce computer network latency, a latency of the computer network system 10 may not include connection handshakes contributing to the timing of transmitting data. These connection handshakes not included in the method 100, may not include, but are not limited to not include, a TCP connection, an https certificate, a key negotiation, a database access for authentication and authorization, the like, and/or combinations thereof.

Another feature of the method 100 may be that the server system 14 does not wait for a connection to be established to send the new message, wherein the computer network system 10 has a connection security that has already been established. In select embodiments, the connection security of the computer network system 10 used in method 100 may be https. Wherein a setup time for a TCP connection and a key negotiation may be included in each of the multiple requests 18 for the pool of ready connections. Whereby, the setup time for the TCP connection and the key negotiation are not included in a timing for the message transmission latency.

Another feature of the method 100 may be that when the client system 12 establishes the pool of ready connections 16 to the server system, as each connection hits their expiration time 20, the connection may be closed and re-connected with reconnection delay 22, whereby there are always fresh connections to the server system 14 with the client system 12.

Another feature of the method 100 may be that at the time that the new message is available to the client system 12, the server system 14 may be configured to select from the pool of ready connections 16, and send the message response to the client system 12.

In sum, the instant disclosure is directed to a method, computer readable medium, and apparatus for reducing the latency of date between computers. When using this disclosure, a plurality of connections 16 are established between computers for the express purpose of waiting for data to become available. Once the data becomes available, the data is sent to the already connected remote computer for delivery. Using this disclosure, the latency for transmitting data is dramatically reduced, since all the connection handshakes do not contribute to the timing of transmitting data. To support the low latency requirements of the instant disclosure, multiple requests 18 or connections 16 are made to server 14. If no message is available from the server 14, the request times out and the server 14 returns a result and closes the connection. When a new message is available, the server 14 chooses one of the many already established connections 16 to return the new message.

The advantage of the connection pools 16 is the decreased latency from the server 14 when a message is available. No longer will the server 14 wait for a connection to be established to send the new message. The network connection's security (like https) has already been established and the setup time for the TCP connection and key exchange is not included in the timing for the message transmission latency.

Referring to the pool of ready connections 16 in FIG. 1, at the start of the graph, the client 12 establishes connections to the server 14, with each connection having a different expiration time 20. Then, as each connection hits their timeout, the connection is closed and re-connected with a reconnection delay. In this manner, there are always fresh connections to the server 14 from the client 12. Then, at the time that a message is available to the client 12, the server 14 can select from a variety of available client connections 16, and send the message response to the client 12. As such, the manner or method in which the instant disclosure may operate is as follows:

a. Client 12 establishes multiple requests 18 to the server 14 for information.

b. Server 14, not having any information for the client 12, does not respond immediately, instead holds the connections 16 open for future information.

c. Once information for the client 12 becomes available to the server 14, the server 14 selects one of the already established connections 16 to the client 12 and responds with information.

d. If no information for the client 12 becomes available within a timeout period, the server 14 then responds to the client 12 without any information.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein, but is limited only by the following claims.

The invention claimed is:

1. A computer network system to reduce network latency, said computer network system comprising:
   a client system;
   a server system;
   the client system is configured to establish a pool of ready connections comprising multiple requests with the server system, wherein, when the client system makes multiple requests for the pool of ready connections, where each request has an expiration time with the server system;
   if no message is available from the server system, the server system is configured to time out the request based on the expiration time of the request, and the server system returns a result and closes the connection; and
   if a new message is available, the server system is configured to choose one of the pool of ready connections to return the new message to the client system;
   wherein when the client system establishes the pool of ready connections to the server system, as each connection hits the expiration time, the connection is closed and re-connected with a reconnection delay, whereby there are always fresh connections to the server system with the client system;
   whereby, at the time that the new message is available to the client system, the server system is configured to select from the pool of ready connections, and send a message response to the client system;
   wherein the pool of ready connections is established by the client system only for waiting for data to become available from the server system, whereby once data from the server system becomes available, the data is sent to the client system that is already connected for delivery;
   whereby the server system is configured to hold the pool of ready connections open for future information to the client system.

2. The computer network system of claim 1, wherein a latency of the computer network system does not include connection handshakes contributing to a timing of transmitting data.

3. The computer network system of claim 2, wherein the connection handshakes not included in the latency of the computer network system include a TCP connection, an https certificate, a key negotiation, and a database access for authentication and authorization.

4. The computer network system of claim 1, wherein the server system does not wait for a connection to be established to send a new message, wherein the computer network system has a connection security that has already been established.

5. The computer network system of claim 4, wherein the connection security of the computer network system is https, wherein a setup time for a TCP connection and a key negotiation is included in each of the multiple requests for the pool of ready connections, whereby the setup time for the TCP connection and the key negotiation are not included in a timing for a message transmission latency.

6. The computer network system of claim 1, wherein the computer network system uses existing API and protocols, whereby an existing client system is configured for the pool of ready connections, or updated to support the pool of ready connections to the server system.

7. The computer network system of claim 1, wherein the computer network system is configured to transmit information between the client system and the server system at a 0.10 ms delay or less between a first client sending information and a second client receiving the information.

8. The computer network system of claim 7, wherein the computer network system is configured to transmit information between the client system and the server system at approximately a 0.02 ms delay between the first client sending information and the second client receiving the information.

9. The computer network system of claim 1, wherein the computer network system is configured to reduce network traffic by having the server system hold the pool of ready connections open in anticipation of new information and not having a client constantly polling the server system for new information when no information is available, whereby, during a time of no additional information, the network traffic is reduced.

10. The computer network system of claim 1, wherein the computer network system is configured to permit a smaller sever footprint to support the same number of clients, wherein the clients will ask for information from the server system fewer times, whereby an amount of computer resources needed to service the requests of the clients is reduced.

11. The computer network system of claim 1, wherein the computer network system is configured to connect at least 500 clients simultaneously.

12. The computer network system of claim 11, wherein the computer network system is configured to connect at least 5,000 clients simultaneously.

13. The computer network system of claim 12, wherein the computer network system is configured to connect at least 10,000 clients simultaneously.

14. A computer network system to reduce network latency, said computer network system comprising:
   a client system;
   a server system;
   the client system is configured to establish a pool of ready connections comprising multiple requests with the server system;
   whereby the server system is configured to hold the pool of ready connections open for future information to the client system;
   wherein the pool of ready connections is established by the client system only for waiting for data to become available from the server system, whereby once data from the server system becomes available, the data is sent to the client system that is already connected for delivery;
   wherein a latency of the computer network system does not include connection handshakes contributing to the timing of transmitting data, wherein the connection handshakes not included in the latency of the computer network system include a TCP connection, an https certificate, a key negotiation, and a database access for authentication and authorization;
   wherein, when the client system makes the multiple requests for the pool of ready connections, each request has an expiration time with the server system;
   if no message is available from the server system, the server system is configured to time out the request based on the expiration time of the request, and the server system returns a result and closes the connection; and if a new message is available, the server system is configured to choose one of the pool of ready connections to return the new message to the client system;

wherein the server system does not wait for a connection to be established to send the new message, wherein the computer network system has a connection security that has already been established;

wherein the connection security of the computer network system is https, wherein a setup time for a TCP connection and a key negotiation is included in each of the multiple requests for the pool of ready connections, whereby the setup time for the TCP connection and the key negotiation are not included in a timing for a message transmission latency;

wherein when the client system establishes the pool of ready connections to the server system, as each connection hits the expiration time, the connection is closed and re-connected with a reconnection delay, whereby there are always fresh connections to the server system with the client system, whereby, at the time that the new message is available to the client system, the server system is configured to select from the pool of ready connections, and send a message response to the client system;

wherein the computer network system uses existing API and protocols, whereby an existing client system is configured for the pool of ready connections, or updated to support the pool of ready connections to the server system;

wherein the computer network system is configured to transmit information between the client system and the server system at approximately a 0.02 ms delay between the first client sending information and the second client receiving the information;

wherein the computer network system is configured to reduce network traffic by having the server system hold the pool of ready connections open in anticipation of new information and not having a client constantly polling the server system for new information when no information is available, whereby, during the time of no additional information, the network traffic is reduced;

wherein the computer network system is configured to permit a smaller sever footprint to support the same number of clients, wherein the clients will ask for information from the server system fewer times, whereby an amount of computer resources needed to service the requests of the clients is reduced; and wherein the computer network system is configured to connect at least 10,000 clients simultaneously.

15. A method to reduce a latency in a computer network system comprising:
providing the computer network system comprising:
a client system;
a server system;
the client system establishing a pool of ready connections on a server system with multiple requests for information;
setting an expiration time for each ready connection, wherein:
if no message is available from the server system, the server system is configured to time out the request based on the expiration time of the request, and the server system returns a result and closes the connection; and
if a new message is available, the server system is configured to choose one of the pool of ready connections to return the new message to the client system;
the server system holding the pool of ready connections open for future information when not having any information for the client system, whereby the server system does not respond immediately;
the server system selecting one of the pool of ready connections and responding with information once information for the client system becomes available to the server system; and
if no information for the client system becomes available within a timeout period, the server system then responding to the client system without any information.

16. The method of claim 15 wherein the pool of ready connections is established by the client system only for waiting for data to become available from the server system, whereby once data from the server system becomes available, the data is sent to the client system that is already connected for delivery.

17. The method of claim 15, wherein the latency of the computer network system does not include connection handshakes contributing to a timing of transmitting data, thus not including a TCP connection, an https certificate, a key negotiation, and a database access for authentication and authorization;
wherein the server system does not wait for a connection to be established to send the new message, wherein the computer network system has a connection security that has already been established;
wherein the connection security of the computer network system is https, wherein a setup time for the TCP connection and the key negotiation is included in each of the multiple requests for the pool of ready connections, whereby the setup time for the TCP connection and the key negotiation are not included in a timing for a message transmission latency;
wherein when the client system establishes the pool of ready connections to the server system, as each connection hits the expiration time, the connection is closed and re-connected with a reconnection delay, whereby there are always fresh connections to the server system with the client system;
whereby, at the time that the new message is available to the client system, the server system is configured to select from the pool of ready connections, and send a message response to the client system.

* * * * *